United States Patent
San Martin Arribas et al.

(10) Patent No.: US 8,375,001 B2
(45) Date of Patent: Feb. 12, 2013

(54) MASTER MONITORING MECHANISM FOR A GEOGRAPHICAL DISTRIBUTED DATABASE

(75) Inventors: Marta San Martin Arribas, Madrid (ES); Jorge Nevado Jimenez, Alpedrete (ES); Dennis Henriksen, Copenhagen (DK)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 13/121,561

(22) PCT Filed: Sep. 30, 2009

(86) PCT No.: PCT/EP2009/062714
§ 371 (c)(1),
(2), (4) Date: Mar. 29, 2011

(87) PCT Pub. No.: WO2010/037794
PCT Pub. Date: Apr. 8, 2010

(65) Prior Publication Data
US 2011/0178985 A1    Jul. 21, 2011

Related U.S. Application Data

(60) Provisional application No. 61/102,408, filed on Oct. 3, 2008.

(51) Int. Cl.
*G06F 17/30* (2006.01)
(52) U.S. Cl. .......... 707/636; 707/634; 707/635
(58) Field of Classification Search .......... 707/610, 707/634–636, 999.001
See application file for complete search history.

(56) References Cited

U.S. PATENT DOCUMENTS

| 5,440,727 A | 8/1995 | Bhide et al. |
| 5,758,344 A | 5/1998 | Prasad et al. |
| 6,539,381 B1 | 3/2003 | Prasad et al. |
| 6,574,750 B1 | 6/2003 | Felber |
| 7,788,233 B1* | 8/2010 | Iyer et al. ............ 707/661 |
| 2008/0052327 A1 | 2/2008 | Buah |

FOREIGN PATENT DOCUMENTS

WO    WO 01/50264    12/2001

OTHER PUBLICATIONS

Ruben de Juan-Marin et al., "Revisiting Hot Passive Replication" for ARES 2007 on Apr. 2007, 8 pages.*
Stefan Beyer et al., "Increasing Availability in a Replicated Partitionable Distributed Object System" for ISPA 2006, published by Springer-Verlag Berlin Heidelberg, pp. 682-695.*
International Search Report for PCT/EP2009/062714, mailed Apr. 12, 2010.

(Continued)

*Primary Examiner* — Monica Pyo
(74) *Attorney, Agent, or Firm* — Nixon & Vanderhye P.C.

(57) ABSTRACT

A distributed database system with a plurality of nodes is provided, each node storing a replica of at least one partition of data. A method of handling the distributed database system comprises: partitioning data into a number of partitions; replicating each partition into a number of replicas; for each partition, distributing the number of replicas amongst database nodes; activating more than one node; monitoring at each active node events of: latest updating of each replica, replica status, status of local resources in charge of each replica, and connectivity status of each replica; upon activation or deactivation of a node, determining which node is considered current master node for each partition in charge of current master replica; for any request received in a node to read/write data, determining the current master node in charge of the current master replica, and routing said request to said current master node.

17 Claims, 10 Drawing Sheets

OTHER PUBLICATIONS

M. Ciglan et al., *Content Synchronization in Replicated Grid Database Resources*, Third International IEEE Conference on Signal-Image Technologies and Internet-Based System, 2007, pp. 379-386.

Ke Shi, *A Replication and Cache Based Distributed Metadata Management System for Data Grid*, Eighth ACIS International Conference on Software Engineering, Artificial Intelligence, Networking, and Parallel/Distributed Computing, 2007, pp. 20-25.

M. Wiesmann, *Understanding Replication in Databases and Distributed Systems*, 2000 IEEE, pp. 464-474.

E. Pacitti et al., *Preventive Replication in a Database Cluster*, Distributed and Parallel Databases, vol. 18, Issue 3, pp. 223-251, Nov. 2005.

S. Beyer et al., *Increasing Availability in a Replicated Partitionable Distributed Object System*, ISPA '06 Proceedings of the 4th International Conference on Parallel and Distributed Processing and Applications, pp. 682-695, 2006.

R. De Juan-Marín et al., *Revisiting Hot Passive Replication*, 2007 IEEE, 8 pages.

J. Merrells et al., *LDAP Replication Architecture*, Internet Draft, Oct. 2003, 37 pages.

P. Padmanabhan et al., *A Survey of Data Replication Techniques for Mobile ad hoc Network Databases*, The VLDB Journal (2008) 17: 1143-1164.

* cited by examiner

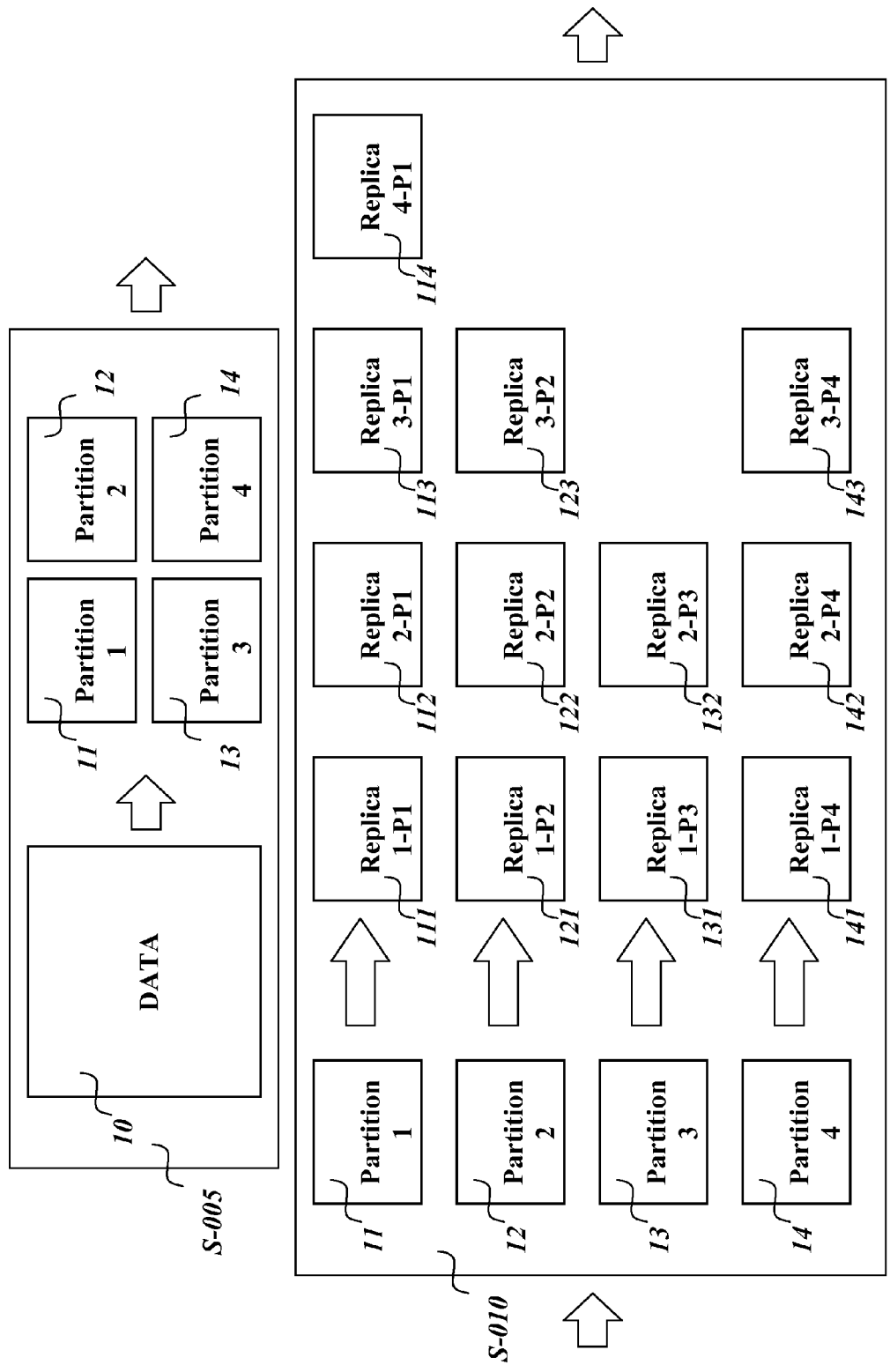
FIG. -1A-

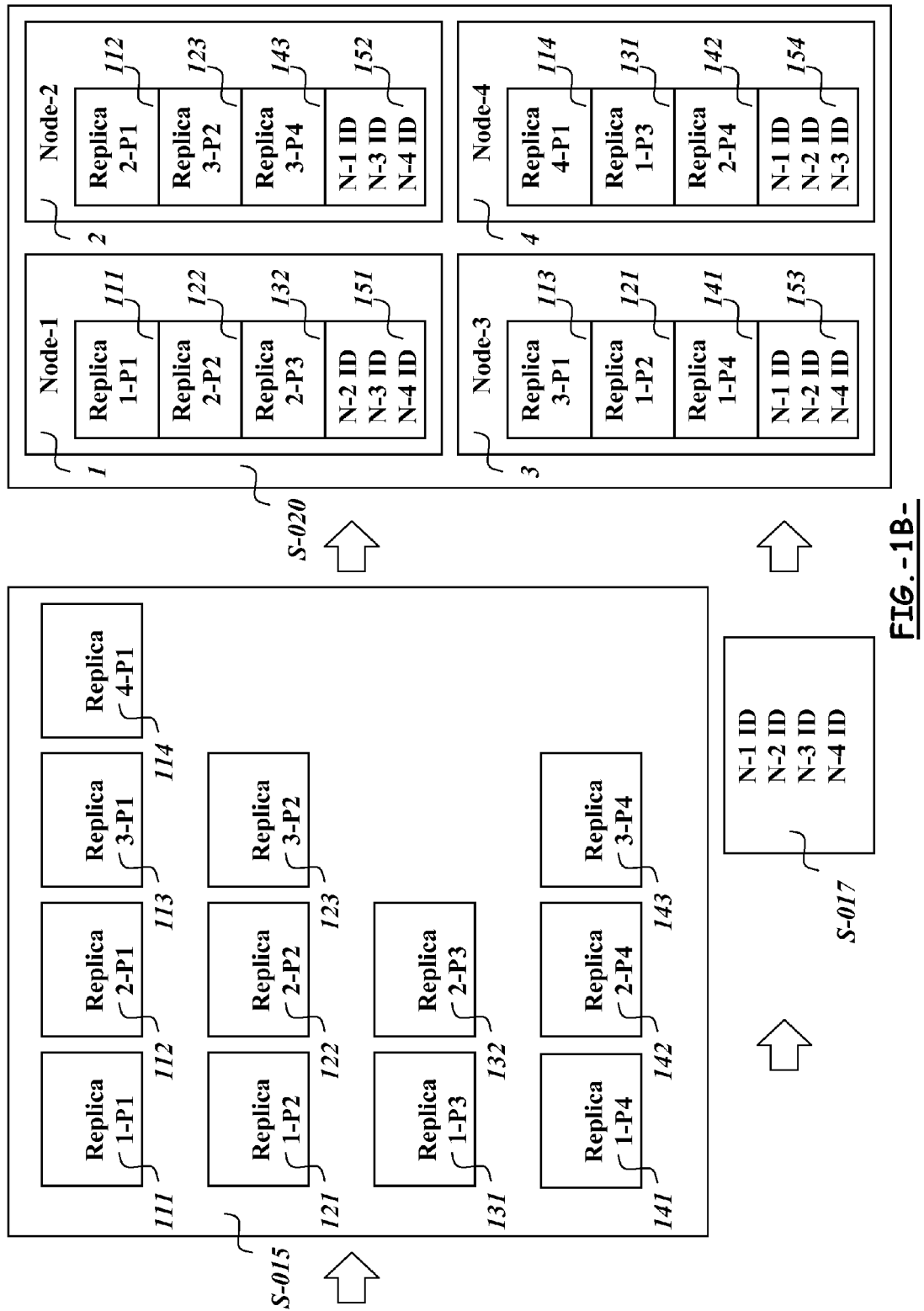
FIG. -1B-

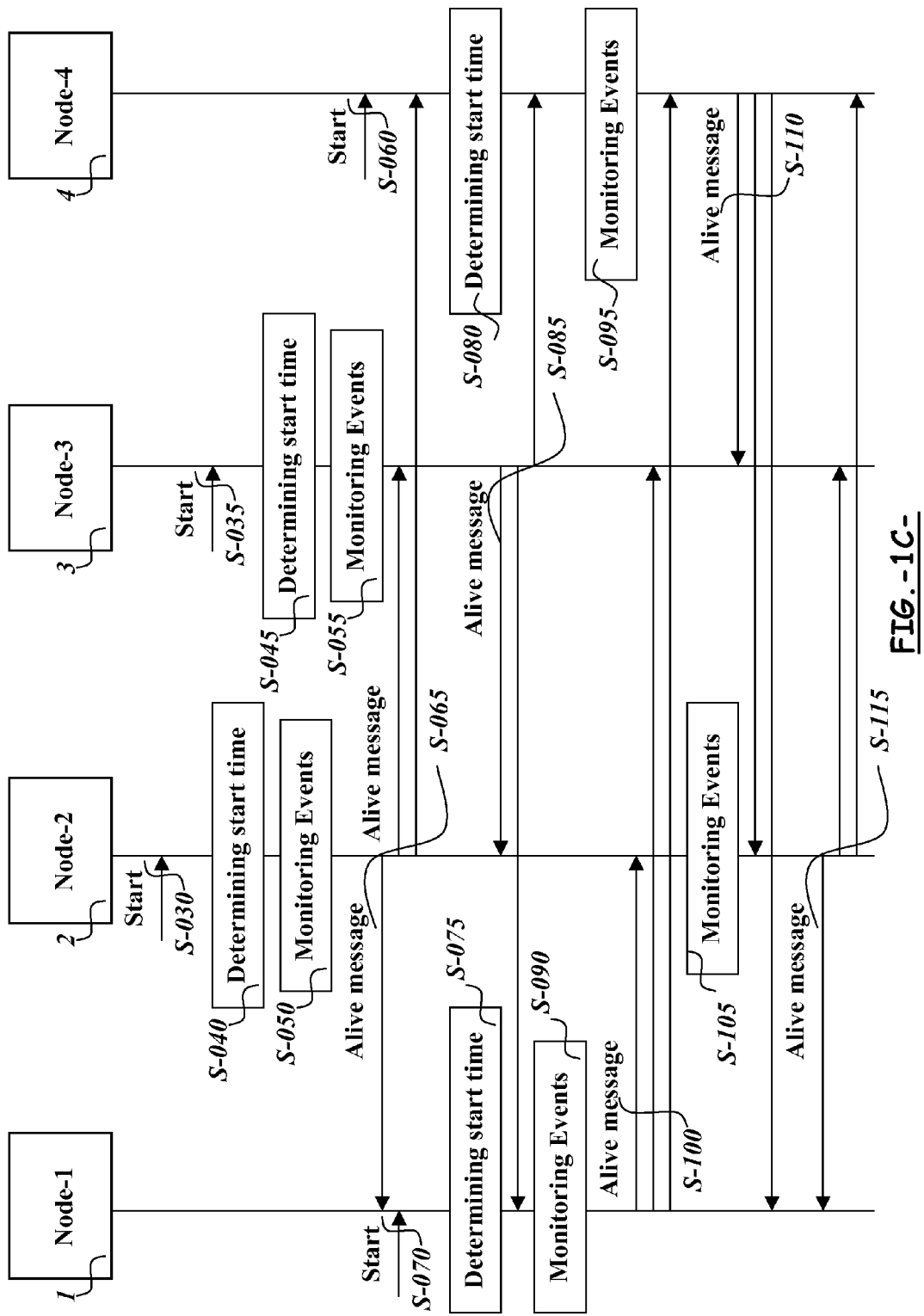
FIG.-1C-

Node-1

| | 1101 | 1102 | 1103 |
|---|---|---|---|
| | Replica 1-P1 | Priority 2 | Last writing 8300 |
| | Replica 2-P2 | Priority 2 | Last writing 45650 |
| | Replica 2-P3 | Priority 1 | Last writing 325 |

Working Time: 87654

*1104*

Node-2

| | 2101 | 2102 | 2103 |
|---|---|---|---|
| | Replica 2-P1 | Priority 1 | Last writing 8327 |
| | Replica 3-P2 | Priority 3 | Last writing 45640 |
| | Replica 3-P4 | Priority 2 | Last writing 459 |

Working Time: 99001

*2104*

Master node for:
– Partition 1: Node 2
– Partition 2: Node 3
– Partition 3: Node 1
– Partition 4: Node 4

*2105*

Node-3

| | 3101 | 3102 | 3103 |
|---|---|---|---|
| | Replica 3-P1 | Priority 3 | Last writing 8299 |
| | Replica 1-P2 | Priority 1 | Last writing 45678 |
| | Replica 1-P4 | Priority 3 | Last writing 505 |

Working Time: 65432

*3104*

Node-4

| | 4101 | 4102 | 4103 |
|---|---|---|---|
| | Replica 4-P1 | Priority 4 | Last writing 8295 |
| | Replica 1-P3 | Priority 2 | Last writing 330 |
| | Replica 2-P4 | Priority 1 | Last writing 510 |

Working Time: 222

*4104*

Master node for:
– Partition 1: Node 2
– Partition 2: Node 3
– Partition 3: Node 1
– Partition 4: Node 4

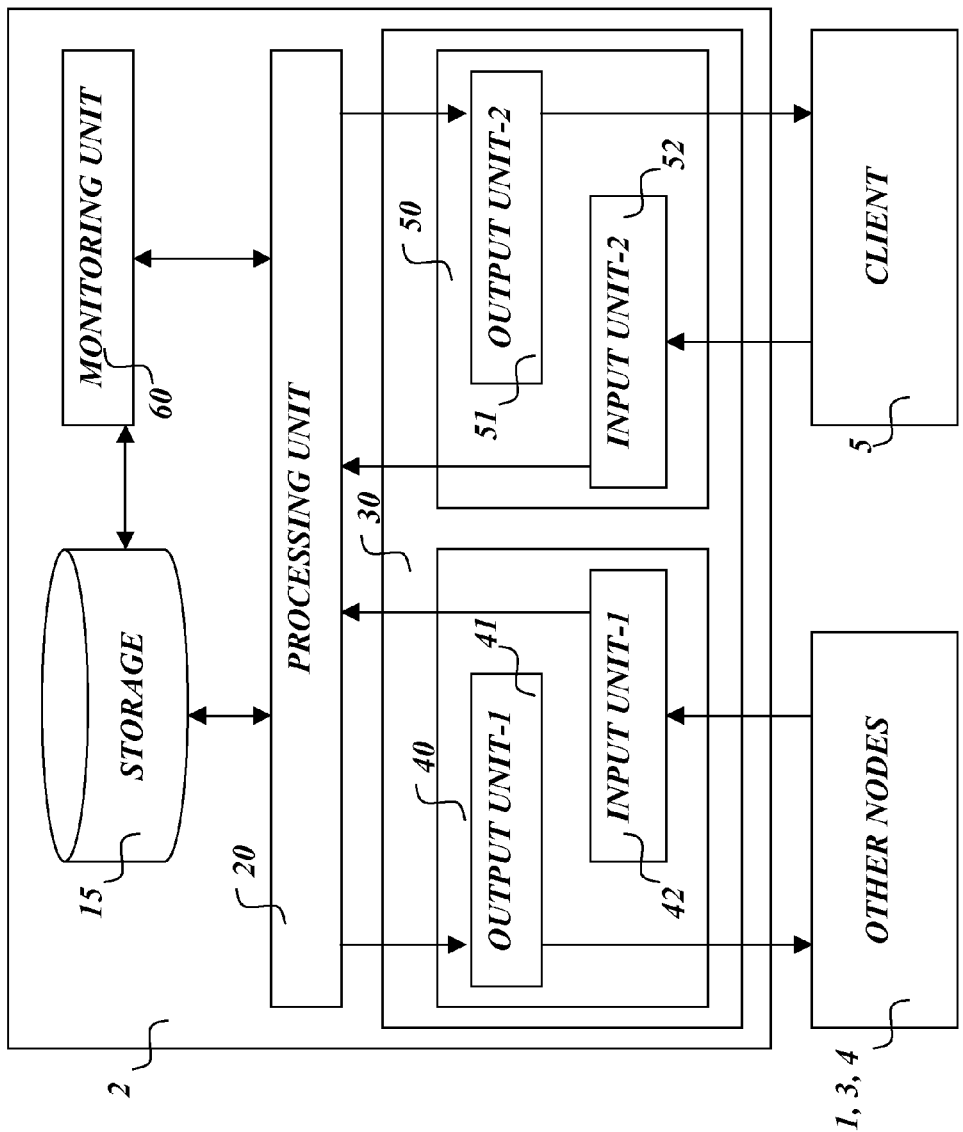
FIG. -3-

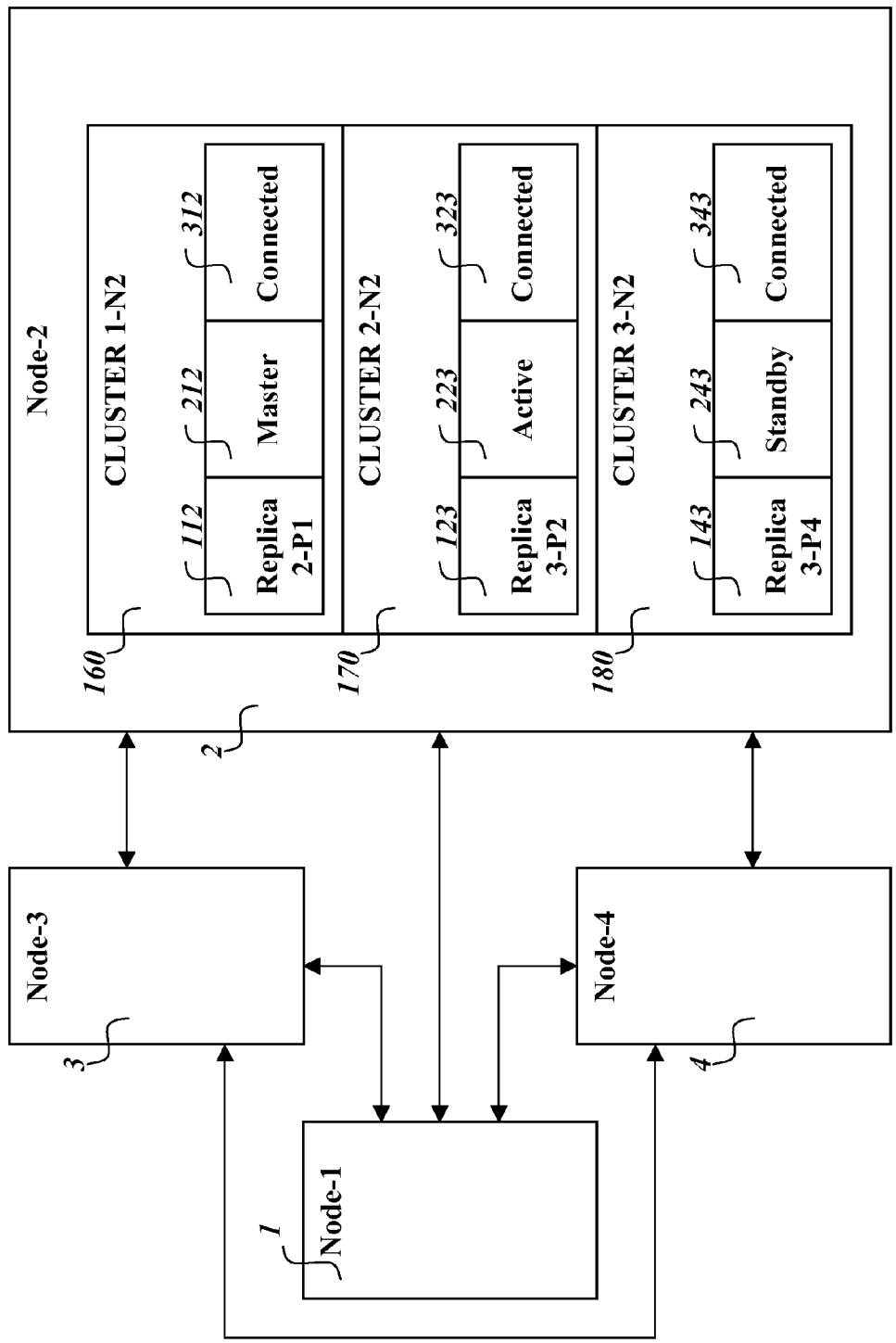
FIG. -4-

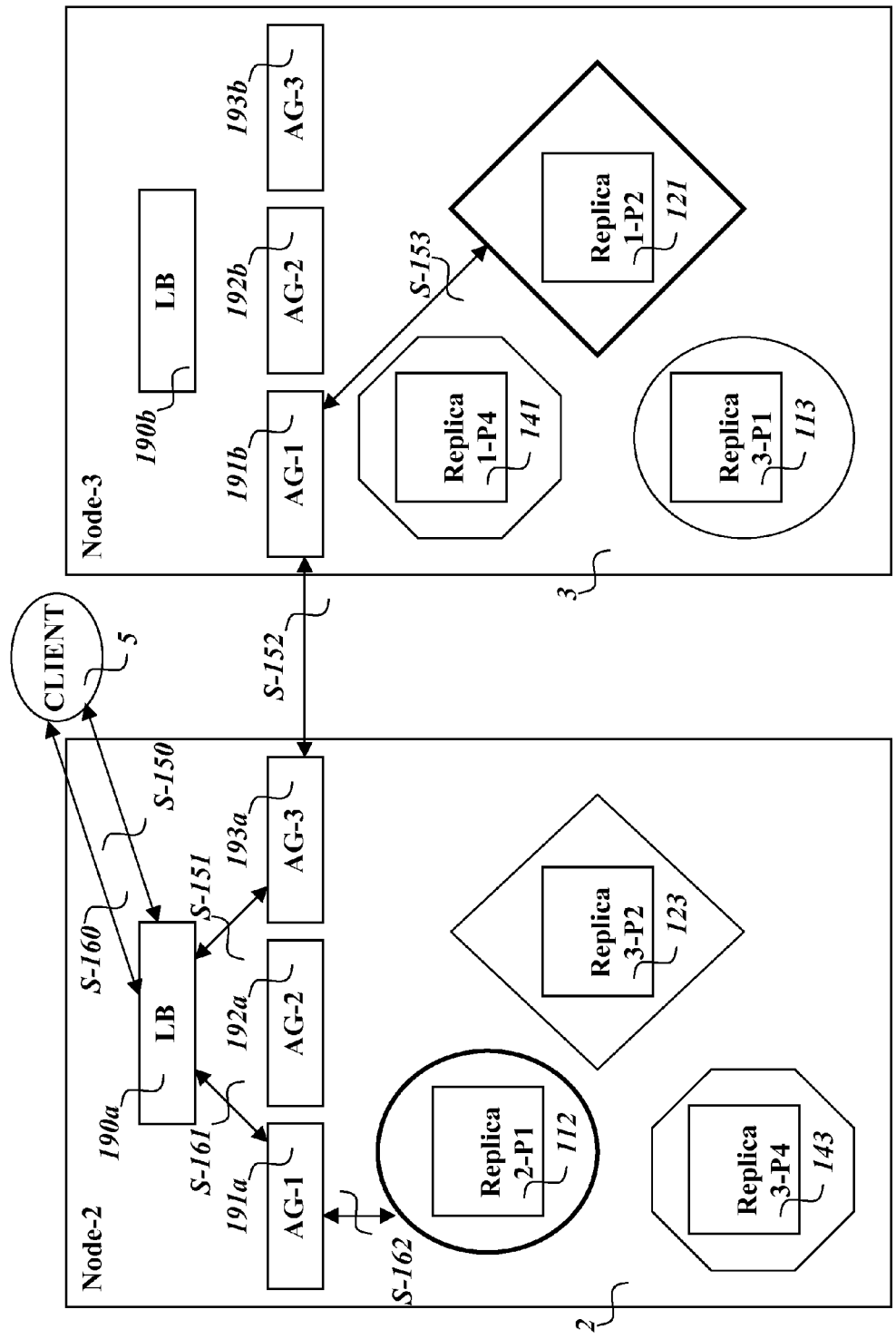
FIG. -5-

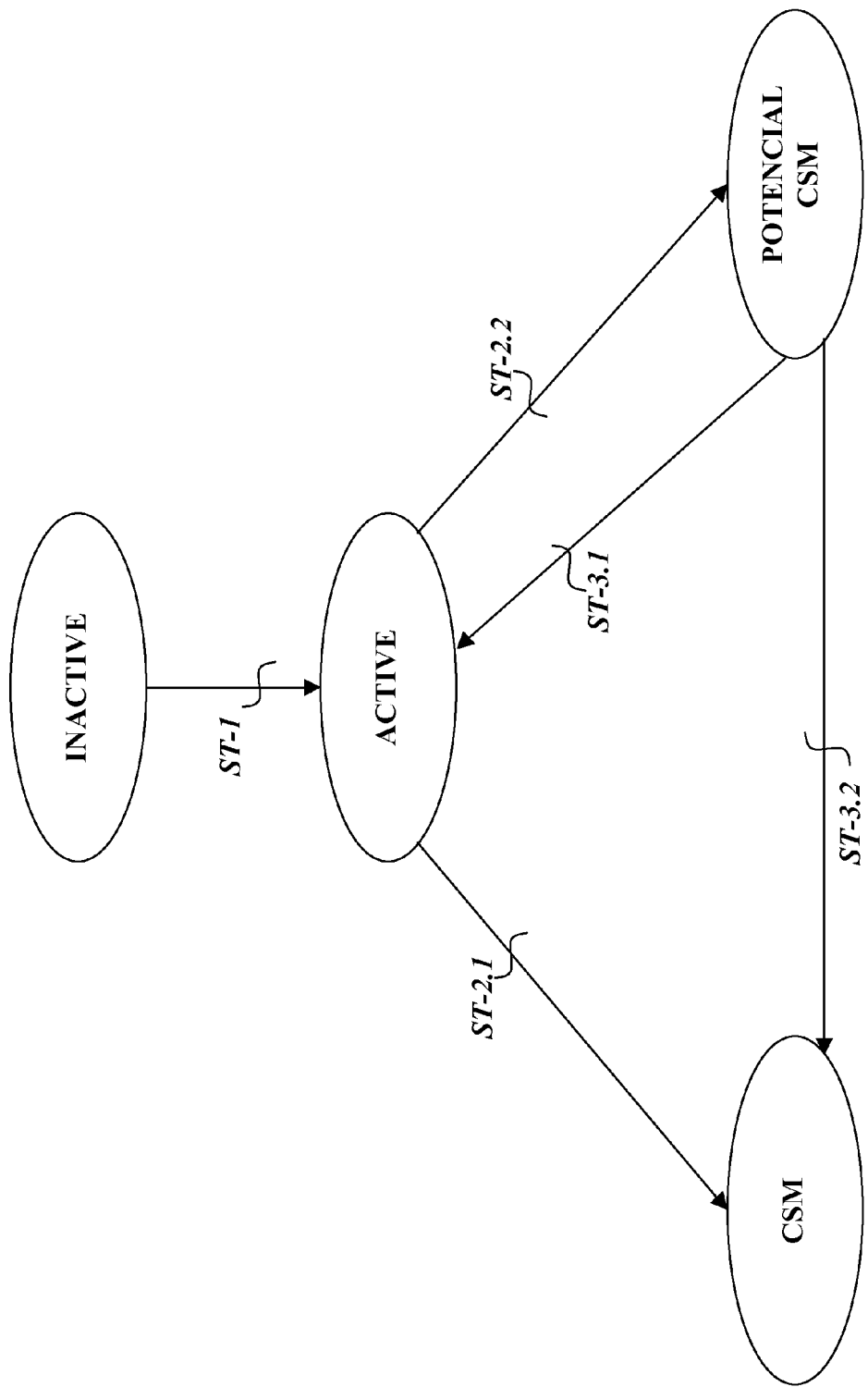
FIG.-6-

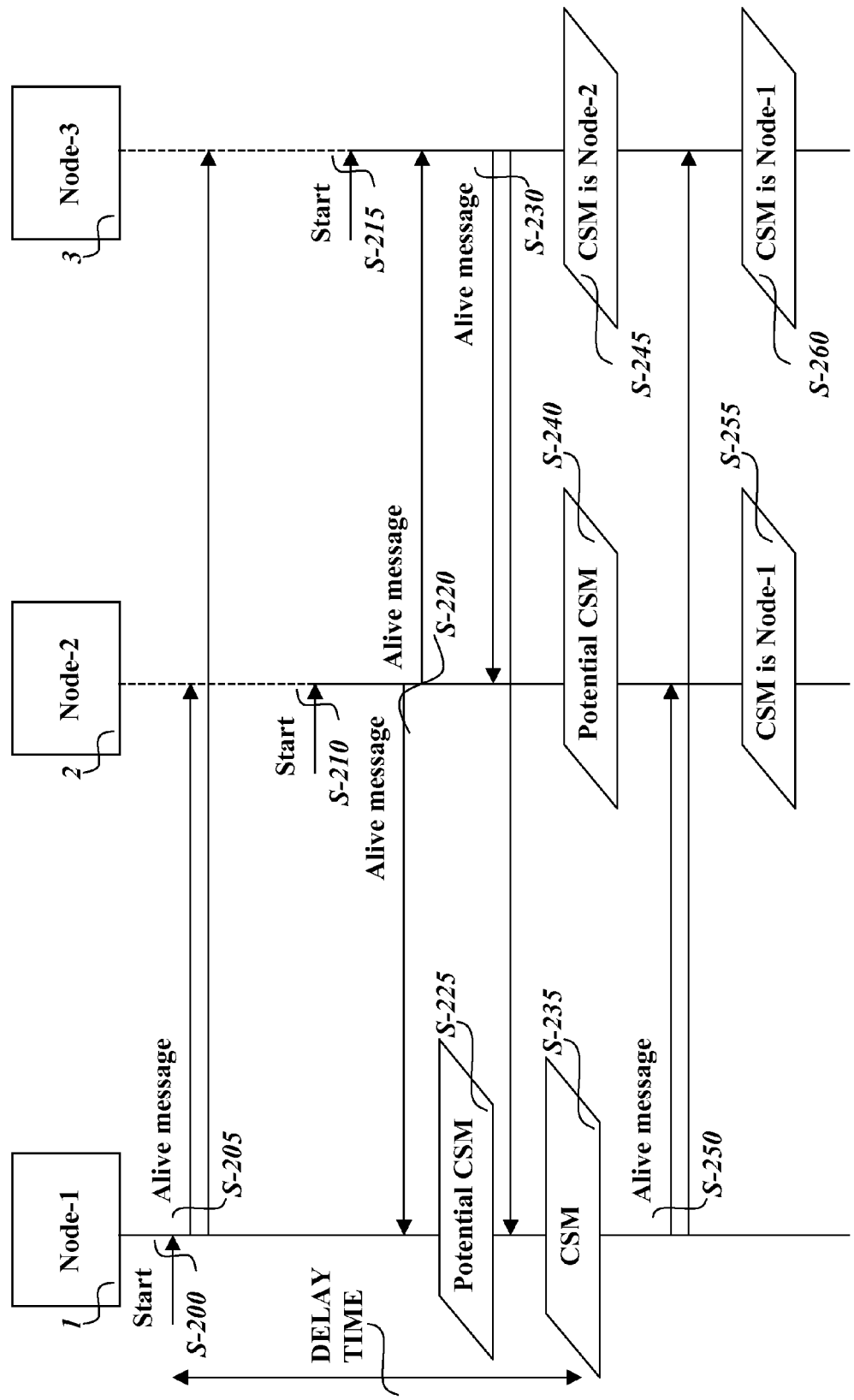
FIG. -7-

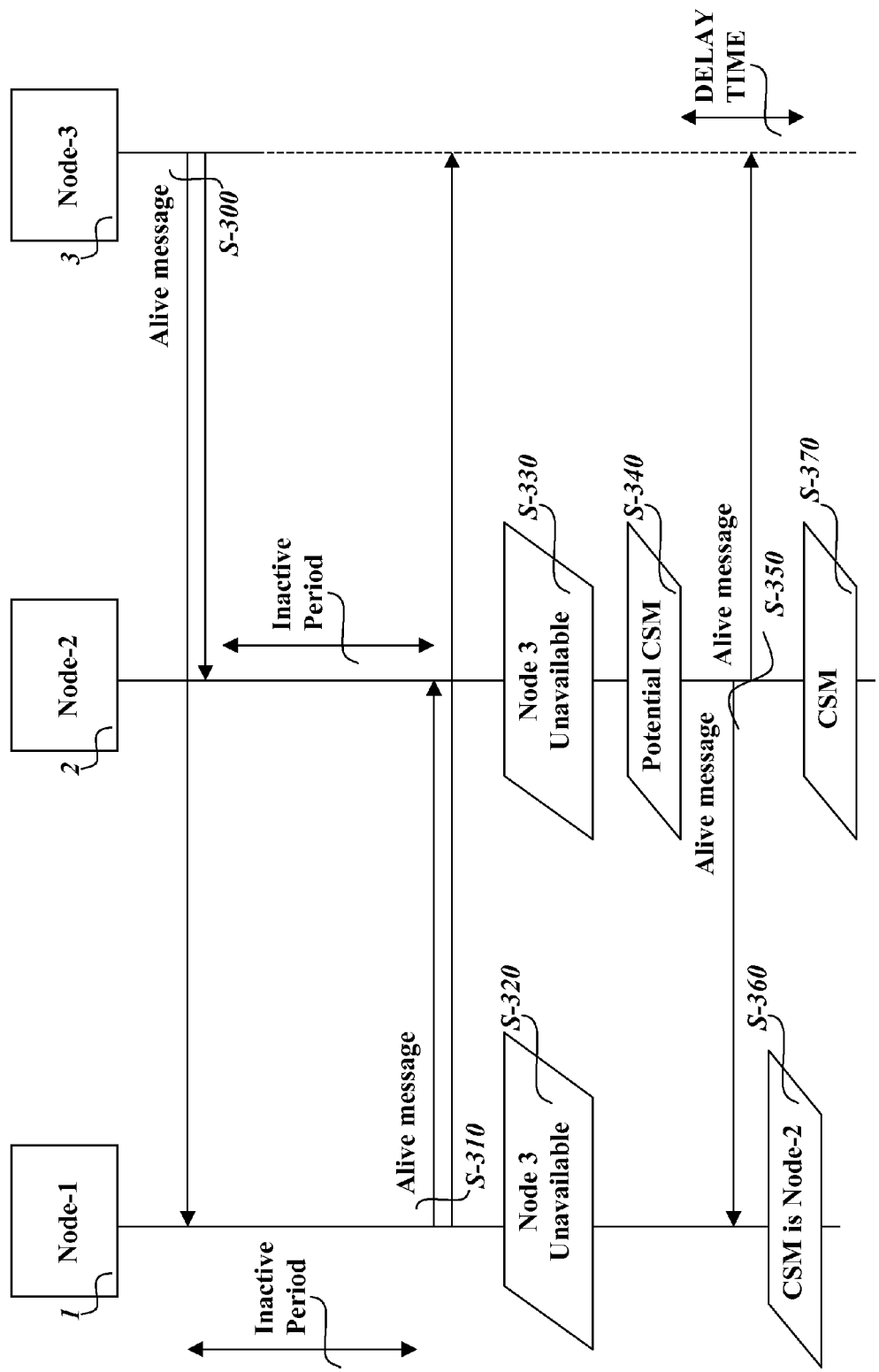
FIG. -8-

MASTER MONITORING MECHANISM FOR A GEOGRAPHICAL DISTRIBUTED DATABASE

This application is the U.S. national phase of International Application No. PCT/EP2009/062714, filed 30 Sep. 2009, which claims priority to U.S. Provisional Application No. 61/102,408, filed 3 Oct. 2008, the entire contents of each of which are hereby incorporated by reference.

TECHNICAL FIELD

The technology relates to distributed databases and, more particularly, to a geographically distributed database usable as a common database for Telecom networks. More specifically, the technology pertains to an enhanced distributed database system as well as a method of handling such distributed database system.

BACKGROUND

The issue of having a common centralized database for a diversity of applications in the field of Telecom networks is addressed. Most of Telecom networks, supporting a variety of different generations of telecommunication systems, being wireline or wireless systems, conventionally make use of one or more common centralized databases to store subscription and subscriber data as well as service data for a variety of applications residing in the Telecommunication network or in a $3^{rd}$ party service network but accessible to subscribers of the Telecom network.

As the Telecom networks grow, newer generations of telecommunication systems turn up and the existing common centralized databases are not always adaptable to, or suitable to fit, the needs of all telecommunication systems in a Telecom network. Nevertheless, Telecom networks share quite similar requirements to be fulfilled by any particular database system usable therein.

A conventional and centralized Telecom database is generally required to support, at least, the following characteristics: resiliency and high availability; consistency; high performance and low latency; high capacity; scalability; geographical redundancy; flexible deployment and data model; single point of access (one in each geographical location); and no single point of failure.

In this respect, geographical redundancy for a conventional and centralized Telecom database has generally been understood as having a replicated node in addition to a main node, the main node being the operative one and the replicated node being on stand-by to resume the operations in case the main node goes down for any reason.

Nowadays, a purely centralized database, amongst other drawbacks, is quite costly in terms of signalling transport; and, in practice, the usage of its resources is not well balanced, since the variety of application data makes some data to be accessed more frequently than others. Regarding the geographical location where the centralized database is located, the choice may be quite significant on the costs of signalling transport, both on economical terms as well as on load and risk of failure terms. Obviously, the longer the signalling path is between a database client and the database itself the more risk exists of encountering a node unable to further submit the signalling towards its final destination. Likewise, the longer this signalling path is the more load the Telecom network supports and the longer execution times. Apart from that, the Telecom networks are nowadays spread through different and far territories often communicated through different access networks belonging to other network operators; in this scenario, the longer this signalling path is the more network operators may be involved and more costs are derivable thereof.

On the other hand, as exploring other technologies, a distributed database may be regarded as a plurality of databases physically or logically distributed, likely under control of a central database management system, and wherein storage devices are not all necessarily attached to a common processing unit. Thus, the distributed database might be built up with multiple computers located in the same physical location, or may be dispersed over a network of interconnected computers.

Generally speaking, the distribution of database instances is not necessarily a consequence of data distribution itself but is beneficial for the purpose of data replication in order to obtain high available systems and for geographical redundancy. More particularly, a so-called Data Layer Architecture technology, which replaces the conventional centralized database system by a number of Telecom database front-ends accessing to a common back-end, the back-end being centralized or distributed, is an exemplary applicability of a distributed database fulfilling the above requirements for a Telecom database and usable for data distribution and replication.

The replication of data in different database instances of a distributed database requires a complex management to keep the existent replicas up-to-date in the different database instances. Moreover, clients of conventionally distributed databases in the field of Telecom networks cannot always be able to perform any database-related operation in a closer database instance, thus not always minimizing the signalling path required for said database-related operation. Furthermore, clients of conventionally distributed databases in the field of Telecom networks may experience trouble to access data where any database instance is unavailable.

SUMMARY

The technology reduces or awards the above drawbacks and provides for an enhanced distributed database system with a plurality of nodes, wherein each node is arranged for storing a replica of at least one partition of data, and a method of handling said distributed database system.

In accordance with a first aspect, there is provided a new method of handling a distributed database system with a plurality of nodes, wherein each node is arranged for storing a replica of at least one partition of data.

This method comprises the steps of: partitioning data to be stored into a number 'p' of partitions; replicating each partition into a number 'r' of replicas; for each partition, distributing the number 'r' of replicas amongst corresponding number 'r' of nodes selected from the plurality of nodes; configuring each node with a list of identifiers of other nodes usable to address each other; activating more than one node amongst the plurality of nodes; monitoring at each active node at least one event selected from: latest updating of each replica, replica status, status of local resources in charge of each replica, and connectivity status of each replica; upon activation or deactivation of a node amongst the plurality of nodes, determining which node amongst the active nodes is considered current master node for each partition and in charge of current master replica for said partition; for any request received in a node to read/write data in the distributed database system, determining the partition said data belongs to and the current master node in charge of the current master replica for said partition, and routing said request to said current master node.

Independently of different embodiments further discussed, on determining which node amongst the active nodes is considered the master node for each partition, and thus being in charge of current master replica for said partition, the method may include in at least one node amongst the active nodes: a step of collecting from each active node information about the at least one event selected from: latest updating of each replica, replica status, status of local resources in charge of each replica and connectivity status of each replica; a step of applying pre-configured rules for prioritizing each replica in the active nodes depending on the collected events for each replica; and a step of selecting a replica in a specific node for each partition with a highest replica priority, this replica to be considered the master replica and this specific node to be considered the master node for the partition.

Two example embodiments are disclosed: namely modes of operation, in determining which node amongst the active nodes is considered master node for each partition and in charge of current master replica for the partition.

In a first mode of operation, and since all the nodes are twin nodes from a processing point of view, all nodes can process the same information and can arrive to determine, for each partition, the same master node in charge of the current master replica. Under this embodiment, not only the above at least one active node, but rather each node in the distributed database system may be arranged to carry out the steps of: collecting from each active node information about the at least one event selected from: latest updating of each replica, replica status, status of local resources in charge of each replica and connectivity status of each replica; applying pre-configured rules for prioritizing each replica in the active nodes, depending on the collected events for each replica; selecting a replica in a specific node for each partition with a highest replica priority, this replica to be considered the master replica and this specific node to be considered the master node for the partition.

In a second mode of operation, upon activation or deactivation of any node amongst the plurality of nodes, the method may further comprise a step of determining the order in which the active nodes have been activated. Where this is the case, all the nodes are arranged for determining the order in which the active nodes were activated, so that the active node firstly activated is considered to be a so-called System Master Monitor node in charge of carrying out the steps of: collecting from each active node information about the at least one event selected from: latest updating of each replica, replica status, status of local resources in charge of each replica and connectivity status of each replica; applying pre-configured rules for prioritizing each replica in the active nodes, depending on the collected events for each replica; selecting a replica in a specific node for each partition with a highest replica priority, this replica to be considered the master replica and this specific node to be considered the master node for the partition; and informing the other active nodes about the master replica selected for each partition and the master node holding said master replica.

Particularly useful where applying the pre-configured rules, depending on the collected events, produces a same priority for more than one replica, the step in this method of distributing the number 'r' of replica amongst corresponding number 'r' of nodes, for each partition, may include a step of configuring each replica with a default replica priority to be applied where other criteria produce the same replica priorities. Where this is the case, the step of determining which node amongst the active nodes is considered master node for each partition, and in charge of current master replica for said partition, may include in the at least one active node the steps of: collecting from at least one active node information of being configured with a given default replica priority for a partition; and selecting a replica in a specific node for each partition with a highest default replica priority, this replica to be considered the master replica and this specific node to be considered the master node for the partition. In particular, where the method operates in accordance with the above first mode of operation, not only the at least one node, but rather each node in the distributed database system may be arranged to carry out these steps.

However, where the method operates in accordance with the above second mode of operation, the active node firstly activated is considered a System Master Monitor and the step of determining which node amongst the active nodes is considered master node for each partition, and in charge of current master replica for said partition, may include in said System Master Monitor node the steps of collecting from at least one active node information of being configured with a given default replica priority for a partition; selecting a replica in a specific node for each partition with a highest default replica priority, this replica to be considered the master replica and this specific node to be considered the master node for the partition; and informing the other active nodes about the master replica selected for each partition and the master node holding said master replica.

Generally speaking, all read/write operations are carried out on the master replica for the relevant partition. Consequently, the contents of the master replica and the contents of other replicas for the same partition may vary at a certain point in time. In order to preserve the consistency amongst the different replicas for each partition, the method may further comprise a step of copying for each partition at each active node the contents of the current master replica from the current master node in charge of the current master replica for said partition. Where this step of copying takes place, the method may further comprise a step of marking for each replica copied at each active node at least one of: the latest updating made, replica status, status of local resources in charge of the replica and connectivity status of the replica. This is especially advantageous in order to select another master replica in the future if the current master node in charge of said master replica fails, gets down or unavailable, or becomes an inactive node.

On the other hand, in accordance with a second aspect, there is provided an enhanced distributed database system with a plurality of nodes, wherein each node is arranged for storing a replica of at least one partition of data. In this distributed database system each node includes: a data storage for storing a replica of at least one data partition of data to be stored and for storing identifiers of other nodes usable to address each other; an input/output unit for communicating with other nodes of the distributed database system and with clients requesting read/write operations in the distributed database system; a monitoring unit for monitoring at least one event selected from: latest updating of each replica, replica status, status of local resources in charge of each replica, and connectivity status of each replica; and a processing unit, in cooperation with the data storage, the monitoring unit and the input/output unit, for determining which node amongst active nodes of the distributed database system is considered current master node for each partition and in charge of current master replica for said partition; for determining, for any request received to read/write data in the distributed database system, the partition said data belongs to and the current master node in charge of the current master replica for said partition; and for routing said request to said current master node.

Aligned with the above method, and irrespective of whether the distributed database system operates in accordance with the first or with the second mode of operation, the processing unit, the monitoring unit, the data storage and the input/output unit of each node may be arranged for: collecting, from each active node of the distributed database system, information about the at least one event selected from: latest updating of each replica, replica status, status of local resources in charge of each replica and connectivity status of each replica; applying pre-configured rules for prioritizing each replica in the active nodes depending on the collected events for each replica; and selecting a replica in a specific node for each partition with a highest replica priority, this replica to be considered the master replica and this specific node to be considered the master node for the partition.

In particular, and also advantageously aligned with the above method where applying the pre-configured rules, depending on the collected events, produces a same priority for more than one replica, the data storage of each node may be arranged for storing an indicator configured per replica basis to indicate a default replica priority to be applied where other criteria produce the same replica priorities. Where this is the case, the processing unit, the monitoring unit, the data storage and the input/output unit of each node may further be arranged for: collecting from at least one active node information of being configured with a given default replica priority for a partition; and selecting a replica in a specific node for each partition with a highest default replica priority, this replica to be considered the master replica and this specific node to be considered the master node for the partition.

Also aligned with the above method, and especially applicable where the distributed database system operates in accordance with the second mode of operation, the processing unit, the monitoring unit, the data storage and the input/output unit of each node may be arranged for collecting, from each active node of the distributed database system, information to determine the order in which the active nodes have been activated.

Where this is the case, the active node firstly activated may be considered a System Master Monitor, and the processing unit, the monitoring unit, the data storage and the input/output unit of the System Master Monitor may be arranged for: collecting from each active node information about the at least one event selected from: latest updating of each replica, replica status, status of local resources in charge of each replica and connectivity status of each replica; applying pre-configured rules for prioritizing each replica in the active nodes depending on the collected events for each replica; selecting a replica in a specific node for each partition with a highest replica priority, this replica to be considered the master replica and this specific node to be considered the master node for the partition; and informing the other active nodes about the master replica selected for each partition and the master node holding said master replica.

Moreover, where the default priority commented above is relevant for prioritizing the replicas for a partition under this second mode of operation, the processing unit, the monitoring unit, the data storage and the input/output unit of the System Master Monitor may further be arranged for: collecting from at least one active node information of being configured with a given default replica priority for a partition; selecting a replica in a specific node for each partition with a highest default replica priority, this replica to be considered the master replica and this specific node to be considered the master node for the partition; and informing the other active nodes about the master replica selected for each partition and the master node holding said master replica.

In order to preserve the consistency amongst the different replicas for each partition, and thus aligned with the above method, the processing unit, the monitoring unit, the data storage and the input/output unit of each node are further arranged for copying for each partition at each active node the contents of the current master replica from the current master node in charge of the current master replica for said partition. Moreover, in order to further selected another master node in charge of the master replica where the present master replica becomes inactive for any reason, the processing unit, the monitoring unit, the data storage and the input/output unit of each node may further be arranged for marking for each replica copied at each active node the latest updating made, replica status, status of local resources in charge of the replica and connectivity status of the replica.

On the other hand, the technology may be practiced using a computer program that is executable by a computer having input and output units and one or more processing units. The program comprises executable code adapted to carry out the above method steps. In particular, this executable code may be recorded in a tangible, non-transitory readable in the computer.

BRIEF DESCRIPTION OF THE DRAWINGS

FIG. 1A illustrates a simplified view of the sequence of actions to be performed for partitioning data to be stored into a number 'p' of partitions and replicating each partition into a number 'r' of replica.

FIG. 1B illustrates a simplified view of the sequence of actions to be performed for distributing for each partition the number 'r' of replica amongst a corresponding number 'r' of nodes selected from the plurality of nodes and for configuring each node with a list of identifiers of other nodes usable to address each other.

FIG. 1C illustrates a simplified view of the sequence of actions to be performed, as a continuation of the actions illustrated in FIG. 1A and FIG. 1B, for carrying out a method of handling a distributed database system with a plurality of nodes, wherein each node is arranged for storing a replica of at least one partition of data.

FIG. 2 shows a simplified view of an exemplary configuration of a plurality of nodes in the distributed database with useful data to describe some example embodiments.

FIG. 3 illustrates an exemplary implementation of a node amongst the plurality of nodes included in the distributed database.

FIG. 4 shows a simplified view of an exemplary configuration of a node amongst the plurality of nodes in the distributed database with useful data arranged as clusters to describe some example embodiments.

FIG. 5 illustrates a simplified view of the sequence of actions to be performed for routing any request received in a node to read/write data in the distributed database towards the current master node in charge of the current master replica for the partition which such data belongs to.

FIG. 6 illustrates an exemplary state machine provided for in accordance with an embodiment to determine which node amongst the active nodes is considered a Controller System Monitor in charge of coordinating the other nodes and deciding which the master node is for each replica.

FIG. 7 illustrates an exemplary sequence of actions to be carried out with support of the state machine shown in FIG. 6 in order to determine which node amongst the active nodes is considered a Controller System Monitor upon activation of a number of nodes in the distributed database system.

FIG. 8 shows still another exemplary sequence of actions to be carried out with support of the state machine shown in FIG. 6 in order to determine which node amongst the active nodes is considered a Controller System Monitor upon inactivity of a previously considered Controller System Monitor.

DETAILED DESCRIPTION

The following describes non-limiting example embodiments of an enhanced distributed database system with a plurality of nodes, each node storing a replica of at least one partition of data, and a method of handling said distributed database system.

A Telecom database system may include several geographically distributed nodes, wherein each node may include several data storage units and wherein each data storage unit in each node may allocate a particular replica of a subset of the data, namely a replica of a partition. As illustrated in FIGS. 1A and 1B, an exemplary distribution of a data set 10 amongst data storage units of nodes 1-4 may be carried out by following a number of steps.

As shown in FIG. 1A, the data set 10 is partitioned during a step S-005 into a number of partitions 11-14, each partition comprising a particular subset of the data set 10. Then, for each partition a number of replicas are generated during a step S-010. The number of replicas for each partition is not required to be the same for all the partitions. Thus, as exemplary illustrated in FIG. 1A, four replicas 111-114 are generated for the partition 11, whereas three replicas 121-123 and 141-143 are respectively generated for partitions 12 and 14, and only two replicas 131-132 are generated for the partition 13.

As shown in FIG. 1B, these replicas may be grouped per partition basis during a preliminary step S-015 of determining the required geographical distribution. Apart from that, as determining the geographical distribution of nodes that the database system consists of, each node is assigned during a step S-017 an identifier usable for addresses purposes. The exemplary illustration in FIG. 1B shows a distributed database system consisting of four nodes 1-4 with respective identifiers N-1 ID, N-2 ID, N-3 ID and N-4 ID.

Then, during a step S-020, the replicas generated for each partition may be distributed amongst the nodes that the database system consists of. As exemplary illustrated in FIG. 1B, the first replica 111 of the first partition is stored in node 1, the second replica 112 of the first partition is stored in node 2, the third replica 113 of the first partition is stored in node 3, the fourth replica 114 of the first partition is stored in node 4, the first replica 121 of the second partition is stored in node 3, the second replica 122' of the second partition is stored in node 1, the third replica 123 of the second partition is stored in node 2, the first replica 131 of the third partition is stored in node 4, the second replica 132 of the third partition is stored in node 1, the first replica 141 of the fourth partition is stored in node 3, the second replica 142 of the fourth partition is stored in node 4, and the third replica 143 of the fourth partition is stored in node 2. Thus, not every node is required to store a replica for each partition and not every partition must have a replica in each node of the distributed data system.

Apart from that, each node may also be configured during this step with identifiers of the other nodes. Thus, the node 1 stores identifiers 151 identifying the nodes 2, 3, 4; the node 2 stores identifiers 152 identifying the nodes 1, 3, 4; the node 3 stores identifiers 153 identifying the nodes 1, 2, 4; and the node 4 stores identifiers 154 identifying the nodes 1, 2, 3.

In operation, and depending on certain events further discussed, one particular replica in a certain node may acquire a highest priority and is thus determined to be the master replica for a partition whereas the certain node is considered the master node for the partition. However, there may be situations where the events produce the same priority for different replicas of a partition in different nodes so that a master replica can not be determined. In order to save the ambiguity where more than one replica is given the same priority, the technology described in this application provides for configuring each replica with a default replica priority to be applied where other criteria, namely the result of processing the above events, produce the same replica priorities. As shown in FIG. 2, each node 1-4 respectively includes a replica 1101, 2101, 3101, and 4101 for a number of partitions, and a default priority per replica basis 1102, 2102, 3102, and 4102.

Once each node of the distributed database system has been configured as described above, the distributed database system is ready for entering in operation, node by node or as simultaneously as wanted by the operator.

FIG. 1C illustrates subsequent sequence of actions to carry out the method of handling said distributed database system. Even though all the nodes behave in a similar manner, the complete sequence of actions at each node may depend on the order in which the different nodes are activated. Thus, FIG. 1C exemplary illustrates a scenario where the node 2 is the firstly activated one, during a step S-030, followed by the activation of the node 3 during a step S-035, then the node 4 during a step S-060, and finally the node 1 during a step S-070.

The activation of each node 2, 3, 4, 1 may be followed by respective steps S-040, S-045, S-080, S-075 of determining at each active node a start time when the said node has been activated. This optional step is useful to further determine the order in which the active nodes have been activated where the database system is operating with a node acting as a System Master Monitor in charge of coordinating the other nodes and deciding which is the master replica for each partition as further commented. In this respect, as FIG. 2 illustrates, each node 1-4 includes a respective indication 1104, 2104, 3104, 4104 indicating the working time that the node has been active since the start time.

Irrespective of whether the step of determining the start time for each node is carried out, the activation of each node 2, 3, 4, 1 is generally followed by respective steps S-050, S-055, S-095, S-090 of monitoring at each active node 2, 3, 4, 1 at least one event selected from: latest updating of each replica, replica status, status of local resources in charge of each replica, and connectivity status of each replica.

To this end, as exemplary illustrated in FIG. 2, each node 1-4 respectively includes an indicator of the latest updating per replica basis 1103, 2103, 3103, 4103, along with the replica 1101, 2101, 3101, 4101 for a number of partitions, and the default priority per replica basis 1102, 2102, 3102, 4102 already commented above. Apart from the data exemplary shown in FIG. 2, other data may be stored per replica basis at each node 1-4 such as those illustrated in FIG. 4. Thus, as exemplary illustrated in FIG. 4, the node 2 respectively includes an indicator 312, 323, 343 of connectivity status per replica basis along with the replica 112, 123, 143 for a number of partitions, and a replica status per replica basis 212, 223, 243 indicating whether the replica is considered the master replica, an active replica being up and running but not being the master, or a stand-by replica on which configuration is taking place so that cannot be considered up and running. In particular, each node may have a further storage field per replica, not illustrated in any drawing, to include indicators of status of local resources per replica basis so that the process of supervising the local resources for each replica may be isolated from the step of monitoring such event. Alternatively, the above step of monitoring at each active node at least one event of the choice may include a step of supervising the local resources for each replica and a step of determining the status of each local resource.

Still with reference to FIG. 4, each node 1-4 of this distributed database system may be configured with a number of clusters wherein each cluster includes: a replica of a partition, an indicator of connectivity status for the replica, a replica status for the replica, an indicator of the latest updating per replica basis, and a default priority per replica basis. Thus, as exemplary illustrated in FIG. 4, the node 2 comprises clusters 160, 170, 180, each cluster respectively including a replica 112, 123, 143 of a partition along with data and indicators for the replica.

Back to the sequence of actions illustrated in FIG. 1C, and once the step of monitoring events have been carried out at each node, each node initiates during respective steps S-065, S-085, 5-100, S-110 the sending of so-called 'Alive' messages towards all the other nodes known to each node.

As anyone skilled in the art may understand, some actions in node 1 occur before corresponding actions in node 4, whereas the node 4 was initiated before than the node 1. This is generally possible since the processor load in one node may be higher than in another node, thus resulting in slower performance in the former, and it may also be due to different signalling delays through different network paths.

Particularly illustrated in FIG. 1C by way of example, the node 2 had sent during the step S-065 the so-called 'Alive' messages before the node 1 had been activated. As the node 2 receives the 'Alive' messages from the node 1 during the step S-100, the node 2 may be aware that the node 1 had not received the original 'Alive' message and the node 1 does not have the complete information from all the nodes. In these situations, a node like the node 2 in the present exemplary situation carries out a step S-105 of monitoring again the events and a step S-115 of submitting again the 'Alive' messages towards all the nodes known to the node 2. Moreover, as also shown in FIG. 1C, the 'Alive' message is received at the node 2 from the node 3 during a step S-110 intermediate between the step S-105 of monitoring the events at the node 2 and the step S-115 of submitting the 'Alive' messages, so that the latest 'Alive' message submitted from the node 2 may be considered up to date with each node being aware of all other active nodes.

These 'Alive' messages are exchanged between nodes of the distributed database system and are helpful on determining, upon activation or deactivation of a node of the distributed database system, which node amongst the active nodes is considered the current master node for each partition and in charge of the current master replica for said partition, as further discussed.

As commented above, certain events determined in operation are taken into consideration on deciding the master replica for a partition and the master node in charge of said master replica. In order to decide which is the master replica for each partition, the following information may be taken into account: which replica for each partition has the most recently updated contents with complete information, namely, with the updating level; the replica status of each replica for each partition since, obviously, only up and running replicas are eligible; the connectivity status of each replica for each partition; and the default priority configured for each replica of a partition. Moreover, this default priority may be configured to overrule the results of the previous criteria or may be configured to be just applicable where the previous criteria produce the same results for more than one replica of a partition.

Furthermore, pre-configured rules may be applied for prioritizing each replica in the active nodes depending on these events determined in operation. For example, the pre-configured rules may be such that the connectivity status takes priority over the updating level, or such that the default priority is taken into account immediately after than the replica status, or any other criteria on the events for prioritizing replicas.

Regarding the contents of each replica for a partition, as well as the updating of such contents, conventional routines may be provided, whereby each replica updates contents at certain times from the master replica. Thus, not all the replicas for a partition update contents at the same time, and not all the replicas for the partition progress with the updating at the same ratio. During the updating, each node in the distributed database system has to monitor how far the updating has progressed so that the information exchanged with the other nodes in this respect takes due account on whether the replica contents can be considered a complete information or not, and the point in time when the updating was carried out.

In order to take into account the above events on determining the master replica for a partition and the master node in charge of said master replica, the events monitored at each node are communicated towards the other nodes in the distributed database system. To this end, each node 1-4 may be configured with a virtual IP address of the other nodes, or make use of the respective node identifiers 151-154 to identify and address each other, and each node 1-4 may periodically send an 'Alive' message to the other nodes, for example, after expiry of successive delay times. Advantageously in an embodiment, the 'Alive' messages may be sent with the known TCP protocol instead of making use of the UDP for some kind of heartbeat such as to avoid the possibility of unidirectional link failures, which are easily detected with TCP.

More precisely, each 'Alive' message includes a node identifier N-1 ID, N-2 ID, N-3 ID, N-4 ID identifying the sender node to the receiver nodes and may include, for each replica of a partition, at least one of: an identifier of the partition that the replica belongs to, the replica status, updating level, updating time, connectivity status, and default priority.

Additionally, and especially useful to further determine the order in which the active nodes have been activated, each 'Alive' message sent from any node 1-4 towards the other nodes in the distributed database system may respectively include an indication of the working time 1104, 2104, 3104, 4104 that the sender node has been active since its start time.

Two example embodiments are described, namely modes of operation, for determining which node amongst the active nodes is considered master node for each partition and in charge of current master replica for the partition.

In a first mode of operation, and since all the nodes are twin nodes from a processing point of view, each node receives 'Alive' messages from all other nodes with monitoring information determined therein, so that all nodes can process the same information and can arrive to determine, for each partition, the same master node in charge of the current master replica. Under this embodiment, each node in the distributed database system may be arranged to carry out the steps of: collecting from each active node information about the at least one event selected from: latest updating of each replica, replica status, status of local resources in charge of each replica and connectivity status of each replica; applying pre-configured rules for prioritizing each replica in the active nodes, depending on the collected events for each replica; selecting a replica in a specific node for each partition with a highest replica priority, this replica to be considered the master replica and this specific node to be considered the master node for the partition.

Especially advantageous where these events do not result in a highest replica priority for any particular replica under this first mode of operation, each node in the distributed database system may be arranged to further carry out the steps of: collecting from at least one active node information of being configured with a given default replica priority for a partition; and selecting a replica in a specific node for each partition with a highest default replica priority, this replica to be considered the master replica and this specific node to be considered the master node for the partition.

In a second mode of operation, all the nodes process the 'Alive' messages to determine the order in which the active nodes were activated so that the active node firstly activated is considered to be a so-called System Master Monitor node in charge of carrying out the steps of: collecting from each active node information about the at least one event selected from: latest updating of each replica, replica status, status of local resources in charge of each replica and connectivity status of each replica; applying pre-configured rules for prioritizing each replica in the active nodes, depending on the collected events for each replica; selecting a replica in a specific node for each partition with a highest replica priority, this replica to be considered the master replica and this specific node to be considered the master node for the partition; and informing the other active nodes about the master replica selected for each partition and the master node holding said master replica.

Especially advantageous where these events do not result in a highest replica priority for any particular replica under this second mode of operation, the System Master Monitor node in the distributed database system may be arranged to further carry out the steps of: collecting from at least one active node information of being configured with a given default replica priority for a partition; selecting a replica in a specific node for each partition with a highest default replica priority, this replica to be considered the master replica and this specific node to be considered the master node for the partition; and informing the other active nodes about the master replica selected for each partition and the master node holding said master replica. A distributed database system with a plurality of nodes, such as nodes 1-4, is provided, and each node is arranged for storing a replica of at least one partition of data. As illustrated in FIG. 3 for the node 2, each node comprises a data storage 15 for storing a replica 2101 of at least one data partition 112, 123, 143 of data to be stored, and for storing identifiers 152 of other nodes usable to address each other; an input/output unit 30 for communicating with other nodes 1, 3, 4 of the distributed database system; a monitoring unit 60 for monitoring at least one event selected from: latest updating 2103 of each replica, replica status 212, 223, 243, status of local resources in charge of each replica, and connectivity status 312, 323, 343 of each replica; and a processing unit 20, acting in cooperation with the data storage, the monitoring unit and the input/output unit, for determining which node amongst active nodes of the distributed database system is considered current master node 2105 for each partition and in charge of current master replica for said partition.

Moreover, in this distributed database system, the processing unit 20, the monitoring unit 60, the data storage 15 and the input/output unit 30 of each node are arranged for: collecting, from each active node of the distributed database system, information about the at least one event selected from: latest updating of each replica 1103, 2103, 3103, 4103, replica status 212, 223, 243, status of local resources in charge of each replica and connectivity status 312, 323, 343 of each replica; applying the pre-configured rules commented above for prioritizing each replica in the active nodes depending on the collected events for each replica; and selecting a replica in a specific node for each partition with a highest replica priority, this replica to be considered the master replica and this specific node to be considered the master node 2105, 4105 for the partition.

Furthermore, and especially advantageous where the previous events do not result in a highest priority for any replica in this distributed database system, the processing unit 20, the monitoring unit 60, the data storage 15 and the input/output unit 30 of each node are arranged for: collecting from at least one active node information of being configured with a given default replica priority for a partition; and selecting a replica in a specific node for each partition with a highest default replica priority, this replica to be considered the master replica and this specific node to be considered the master node for the partition.

In order to operate the distributed database system in accordance with the second mode of operation, the processing unit 20, the monitoring unit 60, the data storage 15 and the input/output unit 30 of each node are arranged for collecting, from each active node of the distributed database system, information 1104, 2104, 3104, 4104 to determine the order in which the active nodes have been activated, so that the active node firstly activated is considered a System Master Monitor.

In particular, where a node is considered the System Master Monitor node of the distributed database system, the processing unit 20, the monitoring unit 60, the data storage 15 and the input/output unit 30 of said System Master Monitor may further be arranged for informing the other active nodes about the master replica selected for each partition and the master node holding said master replica.

The above method of handling the distributed database system may require a particular discussion on how clients of the distributed database system may access the information stored therein and, more particularly, for the purpose of read or write operations.

In principle, clients of the distributed database system, such as a Home Location Register, an Authentication Centre, or a Home Subscriber Server of a Telecom network might be, can access any data from any node of the distributed database system. However, in order to preserve data consistency amongst the different replicas, only one of the replicas would receive a request for reading and/or writing, and this would be the master replica. The data in the master replica, as already commented above, is from time to time updated into the other replicas.

The whole contents of the distributed database system can thus be accessible from any node that the distributed database system consists of. To this end, each node may include one or more access gateways (hereinafter AG), wherein the AG is an entity in charge of forwarding the requests to read/write data towards the node where the master replica is located; and, since the database protocol may be different from the accessing protocol, the AG is in charge of receiving the request from a client to read/write data and accessing the other nodes in the distributed database system. Since there may be provided more than one AG in each node in order to maximize performance, a Load Balancer (hereinafter LB) may also be provided to distribute traffic amongst the more than one AG. However, such LB is not required in a node configuration having just one AG.

As FIG. 5 illustrates, the node 2 may be provided with an LB 190*a* and three AG's 191*a*-193*a*, and be in charge of a replica 112 for a first partition 11, a replica 123 for a second partition 12, and a replica 143 for a fourth partition 14, wherein the replica 112 is the master replica for the first partition and the node 2 is the master node in charge of said master replica for the first partition; whereas the node 3 may be provided with an LB 190*b* and three AG's 191*b*-193*b*, and be in charge of a replica 113 for a first partition 11, a replica 121 for a second partition 12, and a replica 141 for a fourth partition 14, wherein the replica 121 is the master replica for the second partition and the node 3 is the master node in charge of said master replica for the second partition.

Thus, this method of handling the distributed database system includes, for any request received in a node to read/write data in the distributed database system, a step of determining the partition that said data belongs to and the current master node in charge of the current master replica for said partition, and a step of routing said request to said current master node.

As exemplary illustrated in FIG. 5, requests from a client 5 to read/write data in the distributed database system may be received at any node, such as the node 2. FIG. 5 exemplary illustrates a request to read/write data received at the LB 190*a* during a step S-150. This request may be assigned during a step S-151 to AG 193*a*, which determines that the data to read/write belongs to the second partition 12, and this AG also determines that the current master node in charge of said partition is the node 3. Then, the AG 193*a* routes the request towards the node 3 during a step S-152. This request may be received in the LB 190*b* of the node 3, if more than one AG exists in said node 3, or may be received in a unique AG if the node 3 only includes one AG, or may be received in a particular AG 191*b* if such AG of the node 3 is known to the AG 193*a* by configuration means, as exemplary depicted in this FIG. 5. The AG 191*b* of the node 3 receiving the request accesses during a step S-152 the master replica 121 for the second partition 12 to read/write data therein in accordance with the request.

On the other hand, FIG. 5 also illustrates the case where the request is received in a master node holding the master replica for the partition which the data belongs to. In this exemplary case, a request to read/write data is received at the LB 190*a* of the node 2 during a step S-160.

This request may be assigned during a step S-161 to AG 191*a*, which determines that the data to read/write belongs to the first partition 11, and this AG also determines that the current master node in charge of said partition is this node 2. Then, the AG 191*a* internally routes the request to access during a step S-162 the master replica 112 for the first partition 11 to read/write data therein in accordance with the request.

The LB of any node of the distributed database system, such as node 2, may be constructed with an input/output unit 50 dedicated for communicating with the client 5, as illustrated in FIG. 3, and with resources of the processing unit 20 arranged for selecting the appropriate AG to balance the workload and performance of the node. This input/output unit 50 may be an integral part of the input/output unit 30 that each node of the distributed database system comprises, or may be a separate module included in said input/output unit 30.

The AG of any node of the distributed database system, such as node 2, may be constructed with an input/output unit 40 dedicated for communicating with other nodes 1, 3, 4, as illustrated in FIG. 3, and with resources of the processing unit 20 arranged for determining the partition that the data to read/write belongs to, for determining whether the master node in charge of the master replica for said partition is the current node or another node of the distributed database system, and for accessing the data storage 15 to access said data, where the master node in charge of the master replica for said partition is the current node, or for routing the request towards another node determined to be the current master node for the partition, otherwise.

The monitoring unit 60 may include a unique unit to monitor and compile the above events, a so-called Local System Monitor (hereinafter LSM) in the instant specification, or might include an active LSM and a stand-by LSM so that the latter could take over operations in case the former fails. In the following, any reference to the monitoring unit or to the LSM is constructed as meaning the active LSM in the node under reference.

In the second mode of operation, the monitoring unit 60 of the so-called System Master Monitor node is considered to be a Controller System Monitor (hereinafter CSM) whereas each monitoring unit of the other nodes in the distributed database system is still referred to as LSM. The CSM may thus decide which the master replica is, by taking into account the events information received from the LSM of each node in the distributed database system, and by applying the pre-configured rules for prioritizing each replica in the active nodes. The CSM communicates each LSM in the other nodes what the master replica for each partition is.

In determining which node amongst the active nodes is considered the System Master Monitor in the second mode of operation the exemplary state-machine illustrated in FIG. 6 may be applied, wherein transitions between states are due either to the reception of an 'Alive' message from other node or the expiration of a timer. For the sake of simplicity, rather than referring to the System Master Monitor node versus the other nodes of the distributed database system, we refer in this discussion to their respective monitoring units 60, namely, to the CSM of the System Master Monitor node versus each LSM of said other nodes.

In an example embodiment, illustrated in FIG. 6, the possible states and transitions may be:

Inactive. It is the state when each LSM starts. If the LSM is in this state, the node does not answer requests, and it can host no master replicas. Transition to this state makes the LSM start sending alive messages to the rest of the nodes.

Active. In active state, each LSM is listening to the 'Alive' messages with information about the other nodes and, particularly, listening to 'Alive' messages from the CSM, if any, with the master replicas. Each LSM is also sending information about its own node, distributing information about the master replicas internally, in its own node to any local AG; and, optionally, forwarding the information to the rest of the nodes in the 'Alive' messages.

Potential CSM. If an LSM stays in this state for a certain configurable time, a so-called DELAY_TIME in the instant specification, such LSM becomes the CSM. It also happens if it receives the 'Alive' messages from all the rest of the nodes in the system before the DELAY_TIME expires.

CSM. A node reaching this state decides which replica is the master replica for every partition in the distributed database system.

Nevertheless, other embodiments of states, transitions, or both are foreseeable as well.

Regarding the transitions between the states shown in FIG. 6, wherein transitions from any state to the inactive state are not shown for the sake of simplicity, any LSM starts in inactive state and, as soon as the node owning the LSM sends 'Alive' messages to all the other nodes in the distributed database system, this LSM goes to active state. That is, the transition ST-1 from the inactive state to active state is the sending of 'Alive' messages from the node owning the LSM in inactive state towards all the other nodes in the distributed database system.

In accordance with another non-limiting and example embodiment provided for in order to solve consistency in split brain situations, by avoiding more than one sub-network to be active, the transition to inactive state may happen when one or more nodes fail, and there are less than (n+1)/2 nodes up and running, including the CSM, or where there are less than n/2+1, not including the CSM, being 'n' the total number of nodes in the distributed database system. For instance, if we have a distributed database system consisting of three nodes and the node hosting the CSM becomes isolated, its sub-network has only one node, that is less than (3+1)/2=2. So, this node hosting the CSM goes to inactive state. The other sub-network has two nodes, that means that it has 2/2+1=2 nodes up, so they remain active and a new CSM is elected. In this optional configuration, each LSM detects that one or more nodes are down if after a configurable period of time, a so-called INACTIVE_TIME in the instant specification, each LSM receives no 'Alive' messages from said one or more nodes. The transition to inactive makes any LSM resetting its execution time, thus becoming "young" again. That prevents a previous CSM that was isolated to become CSM again and send deprecated information.

This embodiment may be carried out by appropriately configuring the distributed database system. If such embodiment is not wanted, a suitable configuration parameter can be reset so that the account of number of nodes isolated from the system is not relevant for letting the nodes go to the active state, and letting the system to operate with more than one sub-network even if isolated between them.

Back to the transitions between the states shown in FIG. 6, and assuming that the optional embodiment commented above is configured to operate, any node with the LSM in the active state can go back to inactive state if not enough 'Alive' messages from other nodes are received, namely, less than (n+1)2 nodes up including the CSM, or less than n/2+1 not including the CSM.

Otherwise, where enough 'Alive' messages are received from other nodes and the information in the received 'Alive' messages indicate that the sender nodes started later, and no more nodes remain to send messages, the LSM in the receiver node becomes CSM. That is, the transition ST-2.1 from the active state to CSM state is the reception of enough 'Alive' messages from the other nodes, and no more nodes remain to send messages in the distributed database system. Particularly in a two-node system, DELAY_TIME may be gone with no messages received, and the node becomes CSM as well. However, where 'Alive' messages were received from other nodes indicating that said nodes started later, but there are still nodes from which 'Alive' messages are expected to be received, the transition ST-2.2 takes place and the LSM in the receiver node becomes Potential CSM.

From the Potential CSM state, a node can go back to the inactive state, for the same reasons as commented for previous transitions. Otherwise, where a still expected 'Alive' message is received from a node indicating its LSM is a consolidated CSM, or where a still expected 'Alive' message is received from a node showing that other LSM started earlier, the transition ST-3.1 illustrated in FIG. 6 takes place and the LSM in Potential CSM state goes to active state in the node receiving any of these expected 'Alive' messages. On the other hand, where the so-called DELAY_TIME has passed without receiving any further expected 'Alive' message showing a older node, or where 'Alive' messages were received from the rest of the nodes showing that no one started earlier, the transition ST-3.2 illustrated in FIG. 6 takes place and the LSM in Potential CSM state goes to CSM state in the node where the DELAY_TIME has expired or receiving any of these expected 'Alive' messages.

As already commented above, there may be two types of timers: the so-called DELAY_TIME timer in the instant specification, which is the time an LSM waits for 'Alive' messages of the rest of the nodes informing about an older LSM before proclaiming itself as CSM; and the so-called INACTIVE_TIME timer in the instant specification, which is the time an LSM waits for 'Alive' messages from a node before concluding such node is down and unavailable.

Once the above process is finished, the node with a monitoring unit 60 consolidated as CSM starts sending 'Alive' messages including the list of master replicas.

Further to the handling of the state-machine illustrated in FIG. 6, the FIG. 7 shows an exemplary sequence of actions amongst nodes of a distributed database system to determine which node amongst 3 exemplary nodes is the node with a monitoring unit 60 consolidated as CSM. As already commented above, the CSM is the LSM that is activated first. In order to determine that, each LSM at start up sends 'Alive' messages with the working time 2104, 4104, as exemplary shown in FIG. 2, to the rest of the nodes. The nodes that are part of the system are known by configuration. After sending the 'Alive' messages, the LSM waits for a certain period of time, DELAY_TIME, to receive 'Alive' messages from other nodes. The phase of establishing the CSM finishes when that time is gone, or before that, if 'Alive' messages from sufficient other nodes are received. During that phase, a potential CSM can be assigned, according to the information received until that time, but it won't be confirmed till this phase is over.

Thus, as illustrated in FIG. 7, the first node to be activated is node 1 during a step S-200. As soon as the LSM starts, namely, the monitoring unit 60 of the node 1, it sends 'Alive' messages during the step S-205 to the other two nodes 1 and 2 of the distributed database system, and also starts a timer of DELAY_TIME seconds. Since the other nodes are not running yet each corresponding LSM do not receive such 'Alive' messages.

Then, the LSM of node 2 starts running during a step S-210, it sends 'Alive' messages to nodes 1 and 3 during a step S-220 and starts its own timer of DELAY_TIMER seconds. After the LSM of the node 2 has started, but before it sent the 'Alive' messages, the LSM of the node 3 starts during a step S-215 and starts its own timer of DELAY_TIMER seconds.

When the node 1 receives the 'Alive' message from the node 2 appoints itself as Potential CSM during a step S-225 since, with the information it has, it is the LSM that has started earlier whilst waiting for information from the node 3. At this stage, the node 3 is able to send 'Alive' messages towards nodes 1 and 2 during a step S-230.

When the node 2 receives the 'Alive' message from the node 3, it appoints itself as Potential CSM during a step S-240 since, with the information it has, the LSM of the node 2 has started earlier than the LSM of the node 3. Likewise, when the node 3 receives the 'Alive' message from the node 2, it appoints node 2 as Potential CSM during a step S-245 since, with the information it has, the LSM of the node 2 has started earlier, whilst both nodes 1 and 2 are awaiting information from the node 1, still unknown to the node 3.

When the node 1 receives the 'Alive' message from the node 3, it appoints itself as consolidated CSM during a step S-235 since the node 1 has already received 'Alive' messages from all the nodes in the system and, with that information, the LSM of the node 1 is the one that was activated earlier. Then, the node 1 sends 'Alive' messages during a step S-250 to the other nodes informing them that the node 1 is the consolidated CSM. The nodes 2 and 3 eventually receiving the 'Alive' messages from the node 1 realize and thus mark during respective steps S-255 and S-260 that the monitoring unit of the node 1 is the CSM, and no other node can assume this role in the current situation.

The 'Alive' messages are sent from each node to the rest of the nodes periodically, in order to be able to reassign the CSM role in case of failures. In this way, any change in the configuration of the distributed database system, like adding or removing nodes, can be immediately known in all the nodes.

Thus, in accordance with both modes of operation, each node, based on the information received from the other nodes, may determine which node is considered the CSM, i.e. the one that has a longer working time amongst the active nodes. In order for a node to become a CSM, such node could wait at least the DELAY_TIME for assuring there has been some time for receiving remote 'Alive' messages from any other potential CSM. The node reaching the CSM state may communicate its decision to the remaining nodes in order to assure there are no ambiguities, though this communication is not necessary where all the nodes behave in accordance with the first mode of operation. This communication may be TCP-based in order to assure reliability. In order to reduce reconfiguration times, this behaviour may be indirectly achieved when the CSM communicates the replica configuration to the other nodes. In this respect, as the replica status is included in the 'Alive' messages, once elected, the CSM knows which replica status configuration is suitable for working. In fact, this information may be known to all nodes, but they may wait for CSM to confirm under the second mode of operation.

Each node could maintain a list with the current nodes which it has received an 'Alive' message from, along with the replica status received within. Each time the 'Alive' message is received, the sender node may be set as active. Master nodes for partitions may only be elected within active nodes. A node may be set as not available when there has been a period, a so-called INACTIVE_PERIOD, without receiving messages from it. This time could be two or three times the mean time of the receiving messages period, which could be set initially to the aforementioned DELAY_TIME. The node may also be set as unavailable if the 'Alive' messages sent to it do not get through. In this way node availability is detected very fast.

Generally speaking, the node with monitoring unit 60 considered the CSM may submit towards the other nodes in the distributed database system its node identifier, working time, replica status for each replica, master node for each replica, node status from the state-machine, list of active nodes from where 'Alive' messages have been received (even if offline), current Master Replica Information (hereinafter MRI), update time and node Id (including exec time) for the CSM node that set the MRI.

In particular, a so-called MRI message can include a list of replicas with their hosting node. The MRI message might also be sent also to offline nodes, in order to receive confirmation for the MRI. In this respect, an offline node could be the link between a real CSM node and a so-called sub-CSM node, the latter being an LSM running in a node that believes that it is the master, but it is not so. Anyhow, as stated before, no replica of an offline node could be set as master. Therefore, in order to avoid this problem, the CSM process may wait the DELAY_TIME before sending the MRI.

Generally speaking, the CSM election mechanism is such that all monitoring processes are synchronized. As explained before the idea is that the oldest process becomes the CSM. In determining which the oldest LSM is, several embodiments are foreseeable. A first embodiment takes into account the working time, that is, each process determines, with its local time, how many seconds it has been working from the start, and sends that info in the 'Alive' message. There may be a subjacent drawback in this case, as probably latency has an important role to play. The receiving node will see the working time sent, but no the latency, so it would difficult to accurately determine whether the receiving node is younger or older than the sending node. Latency times could be measured, via pings message, and a mean could be established.

A second example embodiment takes into account the Start-up time. Under this embodiment, all processes send their start-up time in the 'Alive' messages. This time will be relative to local machine time at each node. Therefore, there may be a need to synchronize all machines in the system. Linux systems, and operating systems in general, have solved this problem many years ago using NTP.

Under these first and second embodiments, and during the CSM election process, whenever an LSM reaches the inactive state for the exemplary state-machine illustrated in FIG. 6, the respective working time or start-up time might need to be reset in order to avoid that a degraded CSM reaches again the CSM state when it recovers.

As already commented above, upon activation or deactivation of any node of the distributed database system, there is a step of determining amongst the active nodes which one is the current master node in charge of the master replica for each partition. Two example embodiments determine the master node: a first embodiment where all the nodes work independently to determine which the master node is; and a second embodiment wherein a CSM is determined to decide which the master node is for each partition.

FIG. 8 illustrates an exemplary situation wherein the currently considered CSM, which exemplary is the node 3, goes down and becomes unavailable for the other nodes, namely, for nodes 1 and 2.

As shown in FIG. 8, the node 3 acting as CSM sent a latest set of 'Alive' messages during a step S-300 towards the other nodes 1 and 2. Upon respective reception of such messages, both nodes 1 and 2 trigger a so-called Inactivity Period which is not reset until new 'Alive' messages are received from the node 3. Since the Inactivity Period expires at both nodes 1 and 2 without having received further 'Alive' messages from the node 3, both nodes 1 and 2 mark the node 3 as unavailable during respective steps S-320 and S-330. In this exemplary case, the node 2 was older than the node 1, and this information was known to node 2 since it had received the latest periodic 'Alive' message from the node 1 during the step S-310. Therefore, the node 2 goes itself to the Potential CSM state during a step S-340, and in accordance with the state-machine illustrated in FIG. 6. Then, the node 2 sends during a step S-350 its own periodic 'Alive' messages towards nodes 1 and 3, the latter being unavailable to receive such message. The node 1 receiving the 'Alive' message from the node 2 is aware that the node 2 is older and arrives to the conclusion during a step S-360 that the node 2 is the current CSM. After having expired at the node 2 the so-called DELAY_TIME, the monitoring unit 60 of the node 2 is consolidated as CSM during a step S-370, and the node 2 is the current System Master Monitor.

Further, where the node 3 recovers again, which is not shown in any drawing, the node 3 sends its own periodic 'Alive' messages towards nodes 1 and 2. Upon receipt of such messages at nodes 1 and 2, they both mark the node 3 as available again. As already commented above, the node 3 has reset its working time or the start-up time, as the case may be, so that the situation does not change and, after being in a Potential CSM state during a DELAY_TIME, the current CSM is still the monitoring unit of the node 2, which reaches the CSM state in accordance with the state-machine shown in FIG. 6.

Regarding the addition of new nodes never before included in the distributed database system, the situation, from a CSM election perspective, is very similar as the situation where a node has been down and it recovers again. The only difference is that the failing node is known to the CSM because it is present in configuration tables, whereas a completely new node is unknown to the existing nodes. In this respect, the CSM as well as the other monitoring processes do not care about 'Alive' messages received from non-configured nodes. Therefore, an important aspect where introducing a new node is the inclusion of an identifier of the new node into the corresponding configuration tables 151-154 of the already existing nodes, as illustrated in FIG. 1B, and the configuration of the replicas in such new node. Once this has been completed, the monitoring unit of the new node can start. In this way, the new node sends 'Alive' messages to the other already existing active nodes, and the other already existing active nodes will be aware of the new node. As the CSM becomes aware of the new replicas in the new node, it reconfigures the system, if necessary, accordingly. In this respect, where the system operates in accordance with the above first mode of operation, that is, without having a CSM, all nodes respectively process the information received in the 'Alive' messages and arrive to a same conclusion on which is the master node in charge of the master replica for each partition. In principle, the 'Alive' messages comprise the information in the so-called MRI messages. Nevertheless, the MRI messages may be sent separately from the 'Alive' messages.

On the other hand, the addition of a new partition to a running distributed database system may be an easy task with the behaviour previously described. One may think on replicating the partition on at least two replicas to be respectively added into two existing nodes in order to get higher availability than with just one replica in one node. As before explained for configuration of any node, apart from the replica, all the corresponding indicators explained above per replica basis have to be configured as well. Thus, the elected System Master Monitor node with the CSM under the second mode of operation, or every node under the first mode of operation, sooner or later receives 'Alive' messages from all the nodes, wherein information for the new replicas are received from the nodes hosting said new replicas.

In order to effectively providing a highly available distributed database system, the monitoring process is expected to be highly available too. Therefore, as already commented above, two LSM may be running in each node: an active LSM and a stand-by LSM. In operation, the active LSM forwards all received messages to the stand-by LSM, particularly, the 'Alive' messages and also any MRI message, if such MRI message is received. In this way, in case the active LSM crashes, the stand-by LSM takes over immediately, so that a node cannot go down simply because the monitoring process has failed.

The monitoring process may be carried out by the monitoring unit 60 likely in cooperation with the processing unit 20.

Apart from all the above, other specific embodiments are foreseeable. For instance, all dynamic data might be maintained dynamically, instead of being stored along with the configuration data, and updated from time to time. This dynamic data includes the MRI information, as well as the information about the replicas and nodes that is usually sent in the 'Alive' messages. This may be easily achieved by using multicast techniques in a port different than the one used for processes that answer the requests.

In this respect, all 'Alive' messages received from the other nodes, as well as 'Alive' messages sent to configured nodes, may be sent by multicast, no special treatment is necessary. Likewise, MRI messages received by any LSM of a node, or sent by the CSM of the System Master Monitor, may be received or sent by multicast.

Since the MRI is a two phase commit, special considerations are necessary:

If it is an LSM process, and no MRI_ACK has been sent, there is no problem as CSM may reinitiate the connection (anyway, it is very unlikely to happen just in the middle). Nothing to be sent by multicast.
 If it is an LSM process, and the MRI_ACK has been sent, multicast the MRI with a flag indicating "confirmation pending" (for MRI_NACK nothing must be done as it will not be confirmed). This way, the stand-by process may be able to understand the confirmation.
 If it is an LSM process and an MRI_CONFIRM has been received, multicast the MRI with the flag as "confirmed". Stand-by process may interpret the MRI as the most recent one.
 If it is the CSM process, and the MRI has not been sent to any node, nothing must be multicast (the stand-by process, as getting active, may detect that its current MRI does not match the elaborated one, and may initiate the process).
 If it is the CSM process and the MRI has been sent to any node, multicast it as "pendant of confirmation". If the stand-by is to take control it may re-initiate connections with all LMs (already opened connections may time-out and remote SM process may ignore first MRI indication) and send the MRI again.
 If it is the CSM process and the MRI_CONFIRM has been sent to any node, multicast the MRI with flag "confirming" If the stand-by is to take control, it may re-initiate connections to all LSM process to confirm again (already confirmed ones may ignore the messages).
 If it is the CSM process and the MRI_CONFIRM has been sent to all nodes, multicast the MRI as "confirmed", so the stand-by may interpret it as the newer one, but may not initiate confirmation procedure.

As explained above, the MRI messages may need for multicast an additional flag for the "confirmation" state at the very end in order to use common code for parsing. Anyway, all multicast messages might also include, in the last part, one byte that represents the weight of the process in order to resolve race conditions between active and stand-by.

This section describes how the active and stand-by process may detect their state, and what are they supposed to do. Whenever the process starts, it may start listening to receive any multicast message in the distributed database system. If some multicast is received, it may be set as stand-by, and may update any internal data according to the received state (it may not process the state machine as its elected state is received from the Alive message). If the process does not receive any multicast message in DELAY_TIME period after starting, or after previous multicast received packet, it may start listening (opening the port) for 'Alive' and MRI message, and may send its current MRI (which could be empty at initial start up) with the process weight (it will be different for any process in the node). In case the active process receives a multicast message with a weight greater than its own and a non empty MRI, it may stop listening on previous port and may degrade to stand-by (this may solve initial race conditions, which are supposed not to happen during normal operation). The purpose of comparing the empty MRI is to avoid a more weighted process to get control if re-started very fast (anyway, it could wait DELAY_TIME after restarting, so this could not happen unless it just starts at the same time as current active process send its 'Alive' message, and also at the same time neighbour nodes also send their 'Alive' message, which are also multicast).

The following table describes a possible implementation of the protocol used between nodes of the above distributed database system in accordance with an embodiment:

| Position (Bytes) | Length (bytes) | Name | Comments |
|---|---|---|---|
| 0 | 1 | Msg Type | 0x01 will be the Alive message |
| 1 | 1 | Version | |
| 2 | 2 | Node Id | Node Id |
| 4 | 4 | Exec Time | Execution time of current node |
| 8 | 2 | m | Number of replicas local monitored. Only available replicas are sent |
| 10 | 2 | replica master status | Two bytes ORed informing whether sent replicas are configured or not as masters in the node. First node is first bit (relative to $2^0$) and bytes are considered in Big Indian order. Example: 0x5 (0 ... 0101) means first and third node sent are master. |
| 12 | 1 | Node status | Node state: inactive, active, potential CSM, CSM (1, 2, 3, 4) according to event machine |
| P = 13 | 2 | replica id | Id of first replica sent |
| P + 1 | 1 | Memory usage & Ds status | Percentage of memory used in replica |
| P + 3 | 2 | replica Idgroup | Id of Second replica |
| P + 5 | 1 | Memory usage | Memory usage in second replica |
| ... | | | Remaining available replicas |
| P + 3 * (m − 1) | 2 | replica Id | Id of last replica |
| P + 3 * (m − 1) + 2 | 1 | Memory & St | Percentage for the last Ds. |
| P + 3 * m | 2 | Nodes n | Number of available nodes |
| Q = P + 3 * m + 2 | 2 | Node Id | Id of fist available node |
| Q + 2 | 2 | Node Id | Id of second available node |
| ... | | | |
| Q + 2 * (n − 1) | 2 | Node Id | Id of last available node |
| Q + 2 * n | 8 + 5 * D | MRI | Master Replicas Information D represents the number of replicas in this field. |

A computer program, loadable into an internal memory of a computer with input and output units as well as with a processing unit, includes executable code adapted to carry out the above method steps when executed by the computer. In particular, the executable code may be recorded in a non-transitory storage medium.

The various embodiments are intended to be illustrative and non-restrictive. It is expected that those of ordinary skill in this art may modify, these embodiments. The scope of the invention is defined by the claims in conjunction with the description and drawings, and all modifications that fall within the scope of the claims are intended to be included therein.

The invention claimed is:

1. A method for handling a distributed database system with a plurality of nodes, wherein each node is arranged for storing a replica of at least one partition of data, the method comprising the steps of:
    partitioning data to be stored into a number of partitions;
    replicating each partition into a number of replicas;
    for each partition, distributing the number of replicas amongst a corresponding number of nodes selected from the plurality of nodes;
    configuring each node with a list of identifiers of other nodes usable to address each other; and
    activating more than one node amongst the plurality of nodes;
    monitoring at each active node at least one event selected from: latest updating of each replica, replica status, status of local resources in charge of each replica, and connectivity status of each replica;
    upon activation or deactivation of a node amongst the plurality of nodes, a processor of at least one node selected amongst the active nodes: collecting from each active node information about the at least one event, applying rules that prioritize each replica in the active nodes depending on the collected events for each replica, and selecting a replica in a specific node for each partition with a highest replica priority, wherein the selected replica is the current master replica and the specific node is the current master node for the partition; and
    for any request received in a node to read/write data in the distributed database system, determining the partition said data belongs to and the current master node in charge of the current master replica for said partition, and routing said request to said current master node.

2. The method of claim 1, wherein the step of distributing the number of replicas amongst a corresponding number of nodes, for each partition, includes a step of configuring each replica with a default replica priority to be applied in determining the current master replica with highest default replica priority where criteria based on the collected events produce the same replica priorities.

3. The method of claim 2, wherein the step of determining the current master node for each partition, and in charge of current master replica for said partition, includes in at least one node selected amongst the active nodes the steps of:
    collecting from at least one active node a respective default replica priority, wherein the default replica priorities for a partition are used to select the current master replica and current master node with a highest default replica priority.

4. The method of claim 1, wherein upon activation or deactivation of a node amongst the plurality of nodes, the method further comprises a step of determining the order in which the active nodes have been activated.

5. The method of claim 4, wherein the active node firstly activated is considered a System Master Monitor and is the only node among the active nodes carrying out said steps of:

collecting the information about the at least one event, applying the rules for prioritizing each replica depending on the collected events, selecting the replica with the highest replica priority, and informing the other active nodes about the current master replica and the current master node.

6. The method of claim 5, wherein the step of distributing the number of replica amongst the corresponding number of nodes, for each partition, includes a step of configuring each replica with a default replica priority to be applied in determining the current master replica with highest default replica priority where criteria based on the collected events produce the same replica priorities, and wherein the System Master Monitor is the only node collecting from at least one active node a respective default replica priority, in order to select the current master replica with the highest default replica priority and the current master node.

7. The method of claim 1, further comprising a step of copying for each partition at each active node the contents of the current master replica from the current master node in charge of the current master replica for said partition.

8. The method of claim 7, further comprising a step of marking for each replica copied at each active node at least one of: the latest updating made, replica status, status of local resources in charge of the replica and connectivity status of the replica.

9. A distributed database system with a plurality of nodes for which data to be stored has been partitioned into a number of partitions, each partition having been replicated into a number of replicas which are distributed amongst a corresponding number of nodes selected from the plurality of nodes, wherein more than one node amongst the plurality of nodes is activated, said more than one node comprising:
a data storage configured to store a distributed replica of at least one data partition of data to be stored and for storing identifiers of other nodes usable to address each other;
an input/output unit for communicating with other nodes of the distributed database system and with clients requesting read/write operations in the distributed database system;
a monitoring unit configured to monitor at least one event selected from: latest updating of each replica, replica status, status of local resources in charge of each replica, and connectivity status of each replica; and
a processor, in cooperation with the data storage, the monitoring unit and the input/output unit, configured to:
collect, from each active node of the distributed database system, information about the at least one event,
apply rules configured for prioritizing each replica in the active nodes depending on the collected events for each replica,
select a replica in a specific node for each partition with a highest replica priority, where the selected replica is the current master replica and the specific node is the current master node for the partition,
determine, for a request received to read/write data in the distributed database system, the partition said data belongs to, and the current master node in charge of the current master replica for said partition, and
route said request to said current master node.

10. The distributed database system of claim 9, wherein the data storage of each node is configured to store an indicator configured per replica basis to indicate a default replica priority to be applied in determining the current master replica with highest default replica priority where criteria based on the collected events produce the same replica priorities.

11. The distributed database system of claim 10, wherein the processor, the monitoring unit, the data storage and the input/output unit of each node are further configured to:
collect from at least one active node a respective default replica priority, wherein the default replica priorities for a partition are used to select the current master replica and current master node with a highest default replica priority.

12. The distributed database system of claim 9, wherein the processor, the monitoring unit, the data storage and the input/output unit of each node are configured to collect, from each active node of the distributed database system, information to determine the order in which the active nodes have been activated.

13. The distributed database system of claim 12, wherein the active node firstly activated is considered a System Master Monitor, and is the only node among the active nodes wherein the processor, the monitoring unit, the data storage and the input/output unit of the System Master Monitor are configured to: collect the information about the at least one event, apply the rules for prioritizing each replica depending on the collected events, select the replica with the highest replica priority, and inform the other active nodes about the current master replica and the current master node.

14. The distributed database system of claim 13, wherein the data storage of each node is configured to store an indicator configured per replica basis to indicate a default replica priority to be applied in determining the current master replica with highest default replica priority where criteria based on the collected events produce the same replica priorities, wherein the System Master Monitor is the only node among the active nodes wherein the processing unit, the monitoring unit, the data storage and the input/output unit are further configured to collect from at least one active node a respective default replica priority, in order to select the current master replica with the highest default replica priority and the current master node.

15. The distributed database system of claim 9, wherein the processing unit, the monitoring unit, the data storage and the input/output unit of each node are further configured to copy for each partition at each active node the contents of the current master replica from the current master node in charge of the current master replica for said partition.

16. The distributed database system of claim 15, wherein the processing unit, the monitoring unit, the data storage and the input/output unit of each node are further configured to mark for each replica copied at each active node the latest updating made, replica status, status of local resources in charge of the replica and connectivity status of the replica.

17. A non-transitory memory storing a computer program comprising executable code adapted when executed by a computer to carry out the method steps according to claim 1.

* * * * *